(12) United States Patent
Mueller et al.

(10) Patent No.: US 7,847,202 B2
(45) Date of Patent: Dec. 7, 2010

(54) TOP-PAN SCALES WITH CORNER LOAD SENSOR

(75) Inventors: Michael Mueller, Goettingen (DE); Werner Schulze, Goettingen (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 12/341,367

(22) Filed: Dec. 22, 2008

(65) Prior Publication Data
US 2009/0114455 A1 May 7, 2009

Related U.S. Application Data

(63) Continuation of application No. PCT/EP2007/004801, filed on May 31, 2007.

(30) Foreign Application Priority Data

Jul. 11, 2006 (DE) .................. 10 2006 031 950

(51) Int. Cl.
*G01G 23/01* (2006.01)
*G01G 21/23* (2006.01)
(52) U.S. Cl. .................. 177/50; 177/211; 177/229; 73/862.632; 73/862.637
(58) Field of Classification Search ............. 177/25.13, 177/25.14, 50, 211, 229; 73/862.632, 862.637
See application file for complete search history.

(56) References Cited

U.S. PATENT DOCUMENTS

| 4,128,001 A * | 12/1978 | Marks ..................... 73/1.15 |
|---|---|---|
| 4,453,609 A * | 6/1984 | Griffen et al. ............. 177/211 |
| 4,632,198 A * | 12/1986 | Uchimura .................. 177/211 |
| 4,711,314 A * | 12/1987 | Suzuki et al. ............. 177/164 |
| 4,848,477 A * | 7/1989 | Oldendorf et al. ........ 177/25.14 |
| 4,979,579 A * | 12/1990 | Dardat et al. ............. 177/180 |
| 5,190,117 A * | 3/1993 | Freeman et al. .......... 177/244 |
| 5,600,471 A * | 2/1997 | Hirohashi et al. ......... 398/136 |
| 5,606,507 A * | 2/1997 | Kara ......................... 705/408 |
| 5,844,174 A * | 12/1998 | Kuhlmann et al. ......... 177/50 |
| 5,933,263 A * | 8/1999 | Kinstler .................... 398/106 |
| 6,307,165 B1 * | 10/2001 | Komoto .................... 177/229 |
| 6,563,060 B2 * | 5/2003 | Komoto ................ 177/210 EM |
| 6,712,778 B1 * | 3/2004 | Jeffcoat et al. ............ 600/590 |
| 6,910,392 B2 * | 6/2005 | Lockery et al. ....... 73/862.627 |

(Continued)

FOREIGN PATENT DOCUMENTS

DE 30 03 862 A1 8/1981

(Continued)

*Primary Examiner*—Randy W Gibson
(74) *Attorney, Agent, or Firm*—Sughrue Mion, PLLC

(57) ABSTRACT

A top-pan scale with a scale pan which is supported on at least one force transducer (7) of a force measurement system (5) and with a corner load sensor which outputs a signal if the weighing goods are positioned eccentrically on the scale pan. The corner load sensor (10) has a flat underside via which it can be placed on, or attached to, the scale pan or a bottom pan of the scale. The corner load sensor also has a flat upper side on which a scale pan (4) can be placed or attached. The corner load sensor (10) is connected to a positionally fixed electronic processor (22) via a force-feedback-free connection (21). Embodiments of the corner load sensor can therefore be used for a wide variety of scale designs and can be retrofitted easily.

20 Claims, 3 Drawing Sheets

U.S. PATENT DOCUMENTS 6,972,384 B2 * 12/2005 Huitt et al. ............... 177/25.13
7,091,428 B2 * 8/2006 Ikeshima .................... 177/229

FOREIGN PATENT DOCUMENTS

| DE | 38 11 942 A1 | 10/1989 |
| DE | 296 01 431 U1 | 4/1996 |
| DE | 299 18 562 U1 | 3/2000 |

* cited by examiner

TOP-PAN SCALES WITH CORNER LOAD SENSOR

This is a Continuation of International Application PCT/EP2007/004801, with an international filing date of May 31, 2007, which was published under PCT Article 21(2) in German, and the complete disclosure of which is incorporated into this application by reference.

FIELD AND BACKGROUND OF THE INVENTION

The invention relates to a top-pan scale with a scale pan, which is supported on at least one force transducer of a force measurement system, and with a corner load sensor that outputs a signal if the weighing goods are positioned eccentrically on the weighing scale.

Scales of this type are disclosed, for example, in German publications DE 30 03 862 C2 and DE 38 11 942 C2, the complete disclosures of which are incorporated into this application by reference.

A disadvantage of these known scales is that the corner load sensor is integrated into the force transducer or a bottom pan. As a result, a specific configuration of the corner load sensor is necessary for each scale type, and retrofitting existing scales is either not possible at all or only at significant costs.

Retrofitting a scale with a corner load sensor was one object of German Publication DE 299 18 562 U1, the complete disclosure of which is also incorporated into this application by reference. In this publication, at least two force measurement sensors that are spaced at a distance from each other and from the center of the scale pan are provided on the scale pan, along with means for shifting the center of gravity of the weighing goods and the scale pan. However, this shifting of the weighing goods requires either the assistance of the operator or a complex mechanism that is prone to faults (especially if loads are heavy) and lengthens the measurement time. With regard to the specific design of the corner load sensors, DE 299 18 562 U1 furthermore only states that the corner load sensors measure, for example, the elastic deformation of the scale pan or the elastic deformation of the bottom pan by means of strain gauges, for example. Using the scale pan or the bottom pan as the elastic element of the corner load sensor makes the corner load sensor again dependent on the design of the scale pan or the bottom pan, so that the retrofitting goal is achieved only to a very limited extent.

OBJECTS

It would therefore be beneficial to provide a corner load sensor for a scale of the above-described type that is easy to retrofit.

SUMMARY

According to one formulation, a top-pan scale is provided having a weighing pan supported on at least one force transducer of a force measurement system and a corner load sensor that outputs a signal when the weighing goods are positioned eccentrically on the scale pan. The corner load sensor has a flat underside by which it can be positioned onto, i.e. placed on or attached to, the scale pan or a bottom pan of the scale. The corner load sensor also has a flat upper side on which a scale pan can be placed or attached. The corner load sensor is connected to a positionally fixed electronic correction processor via a force-feedback-free connection.

The described geometric configuration with a flat underside and a flat upper side makes it possible to place the corner load sensor e.g. directly onto an existing pan of the scale, and to place an additional, new scale pan onto the upper side. Or, in a scale with a scale pan and a bottom pan, the corner load sensor can be placed directly onto the bottom pan, and the existing scale pan can be placed directly on the flat upper side of the corner load sensor. A fixed connection is preferred but is not absolutely necessary. The position of the weighing goods is not changed, as provided for in German Utility Model DE 299 18 562 U1. Rather, the output signal of the corner load sensor is supplied to an electronic correction processor, where the corner load error is computationally corrected, e.g. in the manner disclosed in German publications DE 30 03 862 C2 and DE 38 11 942 C2. The transmission of the signal is force-feedback-free and uses, for example, a radio or optical link. The signal of the corner load sensor is preferably digitized before transmission to achieve a high degree of interference immunity. The corner load correction is then computed by an external electronic correction processor, preferably a PC or the like, which receives the weighing signal of the scale via the standard data output and the corner load signal from the corner load sensor. As a result, no intervention in the electronics of the scale is necessary.

In a preferred embodiment, the corner load sensor is a vertically arranged short tube that has end flanges at both ends. The end flanges form the flat underside and upper side, and the tubular section disposed therebetween enables strain gauges to be applied.

BRIEF DESCRIPTION OF THE DRAWINGS

Preferred embodiments of the invention will now be described with reference to the schematic drawing figures, in which.

DETAILED DESCRIPTION OF THE PREFERRED EMBODIMENTS

Figure 1:
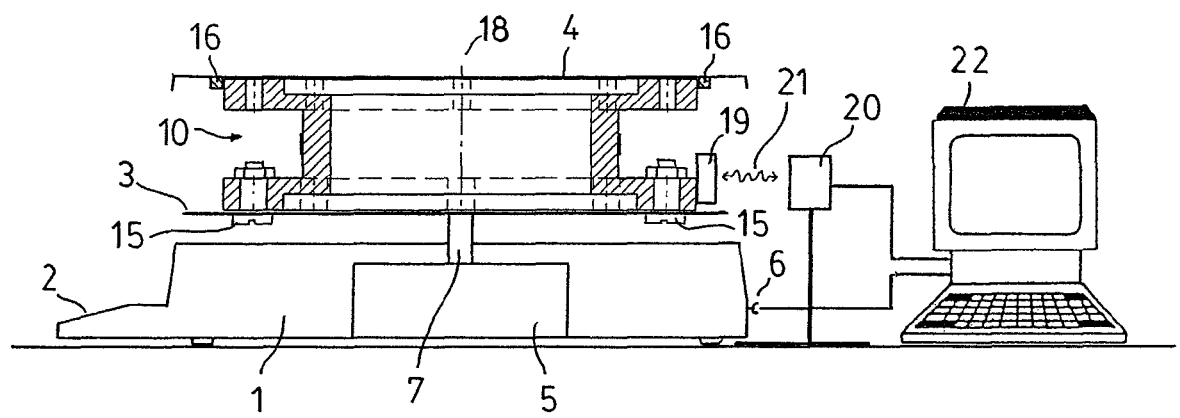
FIG. 1 shows a schematic overview of the scale, the corner load sensor and the electronic correction processor.

FIG. 1 shows a conventional scale 1 with a display 2, a bottom pan 3 that is connected to a force measurement system 5 via a force transducer 7, a scale pan 4, and a data output 6. These components of the scale are generally known and are not described in detail expressly here. In particular, the force measurement system 5 can be based on any desired operating principle, and using, for example, electromagnetic force compensation or a spring element with strain gauges.

In the scale depicted in FIG. 1, the scale pan 4 is not supported directly on the bottom pan 3. Rather, a corner load sensor 10 is placed on the bottom pan 3, and the scale pan 4 is supported solely on that corner load sensor 10. The corner load sensor 10 is shown again in FIG. 2 in an enlarged sectional view and in FIG. 3 in a bottom view. The corner load sensor 10 consists of a short tube 11, a top flange 12 and a bottom flange 13. The flanges 12 and 13 have holes 14 that can be used to attach the corner load sensor to the bottom pan and the scale pan. In particular, the connection between the bottom pan and the corner load sensor is important for a reproducible determination of the position of the center of gravity of the weighing goods. FIG. 1 therefore shows fixation bolts 15, which ensure a fixed connection between the corner load sensor and the bottom pan. In contrast, the connection between the scale pan 4 and the corner load sensor 10 is metrologically less critical. Here, a positive locking fixation 16 (e.g. a form-fitting interconnection) is sufficient in many cases. The upper flange 12 is nevertheless provided with holes 14 to enable a fixed connection, if desired, between the scale pan and the corner load sensor.

Figure 2:
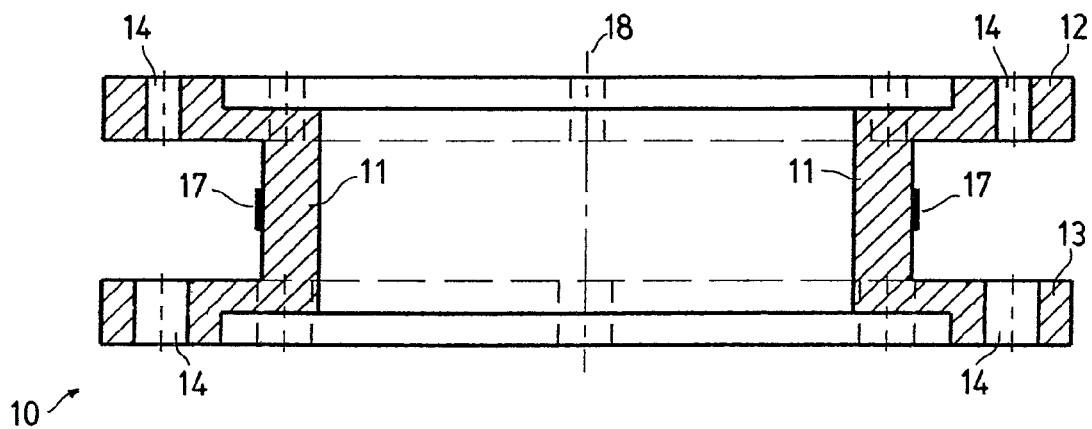
FIG. 2 is an enlarged section of an exemplary embodiment of the corner load sensor.
Figure 3:
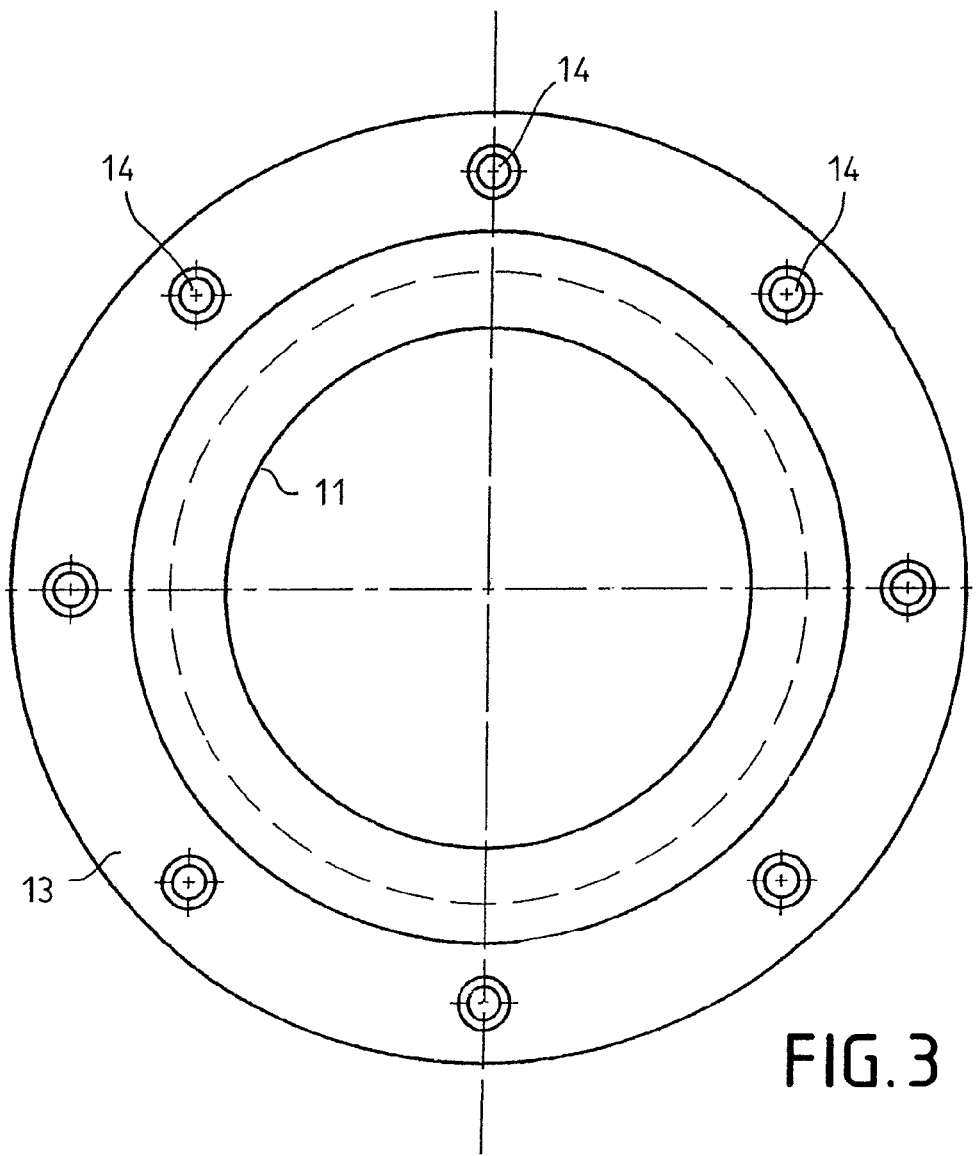
FIG. 3 is a bottom view of the corner load sensor according to FIG. 2.

The corner load sensor 10 preferably has four strain gauges 17 on its tubular portion (tube) 11, to detect the vertical compression of the tube wall under the influence of the weighing goods. To this end the two strain gauges visible in FIG. 2 are interconnected by two fixed resistors in a manner known per se to form a Wheatstone bridge. If the weighing goods are positioned precisely on the axis of symmetry 18 indicated by a dash-dotted line and therefore exactly above the force transducer 7, the two strain gauges 17 are compressed equally and there is no diagonal voltage in the bridge circuit and therefore no output signal. If, on the other hand, the weighing goods are shifted somewhat toward the right, for example, then the right strain gauge is compressed slightly more than the left strain gauge, i.e., its resistance changes to a greater degree, so that a diagonal voltage results as an output signal of the corner load sensor. The two other strain gauges are applied to the tube 11 in front of and behind the drawing plane of FIG. 2 and similarly output a corner load signal if the weighing goods are positioned eccentrically perpendicular to the drawing plane of FIG. 2. It is of course also possible to apply four strain gauges to the tube for each measurement direction and thereby to replace the fixed resistors in the Wheatstone bridge with strain gauges. The output signal is doubled as a result.

The two corner load signals are optionally amplified and digitized in an electronics component 19 so that they can be transmitted via a wireless link 21 to a transmit and receive unit 20. Suitable wireless radio links (e.g., Bluetooth®) and wireless optical links, including their transmission protocols, are generally known and thus are not described in greater detail here. It is also known how to configure this data connection such that the (small amount of) power necessary to operate the electronics 19 is also transmitted. The wireless data and power transmission establishes a force-feedback-free connection and at the same time avoids the various problems associated with the use of batteries or the like on the corner load sensor.

The transmit and receive unit 20 relays the digital corner load signals to an electronic correction processor 22, which is implemented as a personal computer (PC) in FIG. 1. The PC further receives the weighing signal determined by the scale from the standard digital data output 6 and can then calculate the corner load correction (see paragraph below) and display/output the corrected weighing signal. (In other words, the standard display 2 of the scale is not used in the present embodiment.)

When the described corner load sensor is first taken into operation together with a specific scale, any kind of weighing goods are first positioned in the center of the scale pan and thus aligned with the force transducer 7, and the scale display is determined. The weighing goods are then shifted to the right, for example, (i.e., away from the center) and the signal of the corner load sensor and the change in the scale display are noted/stored. The weighing goods are then shifted to the left, and the signal of the corner load sensor and the change in the scale display are again noted/stored. The same procedure may optionally be repeated for different eccentric positions of the weighing goods. The change in the scale display, which is depicted graphically, for example, as a function of the signal of the corner load sensor can be used to calculate the correction function, which gives a weighing result independent of the position of the weighing goods. This correction function is stored in the electronic correction processor 22 and used for correction in subsequent measurements, e.g. according to a known algorithm. It is explicitly noted that, in scales, the dependence of the display of the result on the positioning of the weighing goods on the scale pan is low. The above-described change in the scale display as a function of the positioning of the weighing goods on the scale pan can therefore only be established in very high-resolution scales, including so-called comparator scales, for example. Furthermore, the values of these changes are always small. In general, a linear equation will therefore be sufficient to correct the weighing result. However, the use of a PC as the electronic correction processor makes it possible if necessary to correct also non-linear dependencies or even to correct load-dependent corner load dependencies. The procedure described above for the right/left direction is repeated likewise for the perpendicular direction, and a corner load correction function or a corner load correction factor is determined and stored for this direction, as well. Because the corner load correction generally involves only a few digits, the requirements for the resolution and the reproducibility of the corner load signal are of course also low.

The described geometry of the corner load sensor with a flat underside and a flat upper side readily makes it possible to retrofit scales with a flat scale pan or with a flat bottom pan. However, even with differently shaped scale pans or bottom pans, the manufacture of a specific adapter element is simpler if it can be based on a flat contact surface. The terms 'flat underside' and 'flat upper side' as used in this application should be understood to include a geometry in which a thin bead or the like (not shown) is provided, for example, on one or both flange surfaces, e.g., on the underside, of the corner load sensor e.g. around each of the mounting holes 14. In other words, the term 'flat' extends to any surface topography in which the resting points (e.g. the bead projections) together define a single plane. Thus, the term 'flat' would also encompass an arrangement in which rubber buffers are placed in some or each of the upper holes 14 on the upper side, on which in turn the scale pan may be placed.

The described external evaluation of the corner load signals and the external correction require no intervention either in the mechanics or in the electronics of the existing scale, which greatly simplifies retrofittability.

In the described example, a screw connection is provided between the corner load sensor and the bottom pan. Of course, any other joining techniques, such as riveting or bonding, may also be used. Even a positive locking fixation is often sufficient, in which case a notch or the like should preferably be provided, to prevent rotation of the corner load sensor.

In the example illustrated in FIG. 1, the bottom pan 3 is supported by a single force transducer of a single force measurement system. The described corner load sensor may also be used in scales where the bottom pan or the scale pan is connected by three or four force transducers to a force measurement system or to three or four measurement systems. In that case, the appropriate positioning of the corner load sensor 10 is such that the axis of symmetry 18 is disposed at least approximately in the center between the individual force transducers. The exact position of the axis of symmetry 18 is not critical for measurement accuracy, however, because the described calibration when the corner load sensor is taken into operation includes the calibration of the exact positioning.

Figure 4:
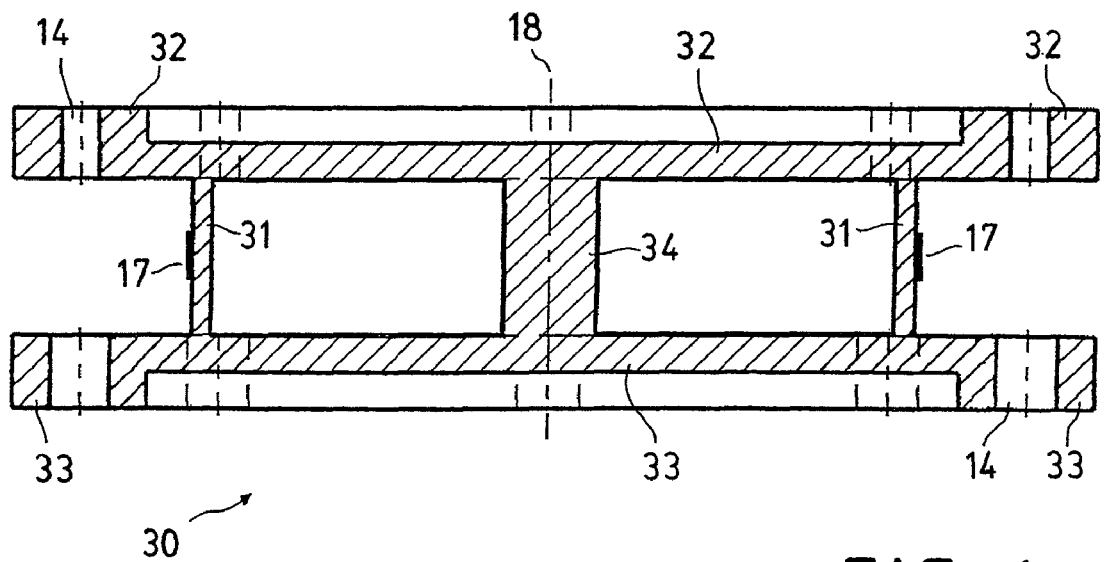
FIG. 4 is a sectional view of a second embodiment of the corner load sensor.

FIG. 4 shows a second embodiment of the corner load sensor in a sectional view. This corner load sensor 30 again consists of a tube 31 with flanges 32 and 33. The flanges 32 and 33 are disk-shaped in this embodiment. In the axis of symmetry 18 of the tube 31 a support rod 34 connects the upper and lower end flanges. The wall of the tube 31 is relatively thin, so that the weight of the weighing goods is largely absorbed by the support rod 34 if the weighing goods are positioned in the center. If the weighing goods are positioned eccentrically, however, the corner load torque is primarily absorbed by the tube 31 with the strain gauge 17 because the support rod 34 is relatively weak against bending. For the same total cross section of the support rod 34 and the tube 31 as compared to the cross section of the tube 11 alone in the embodiment of FIGS. 2 and 3, the basic signal is then approximately the same for both embodiments if the weighing goods are positioned in the center. If the weighing goods are positioned eccentrically, however, the signal of the strain gauges on the tube 31 is substantially larger than the signal of the strain gauges on the tube 11 because the wall thickness of the tube 31 is substantially thinner than the wall thickness of the tube 11.

The corner load sensor depicted in FIG. 4 may, for example, be manufactured by forming the support rod 34, the tube 31 and the one flange as a single piece, producing the other flange with a hole in the center for the support rod and then joining the two parts together, e.g., by welding. It is also possible to produce the entire unit as a single piece if the tube 31 has a plurality (e.g., eight) holes distributed over its circumference to make it possible to machine the hollow space using a milling cutter.

Figure 5:
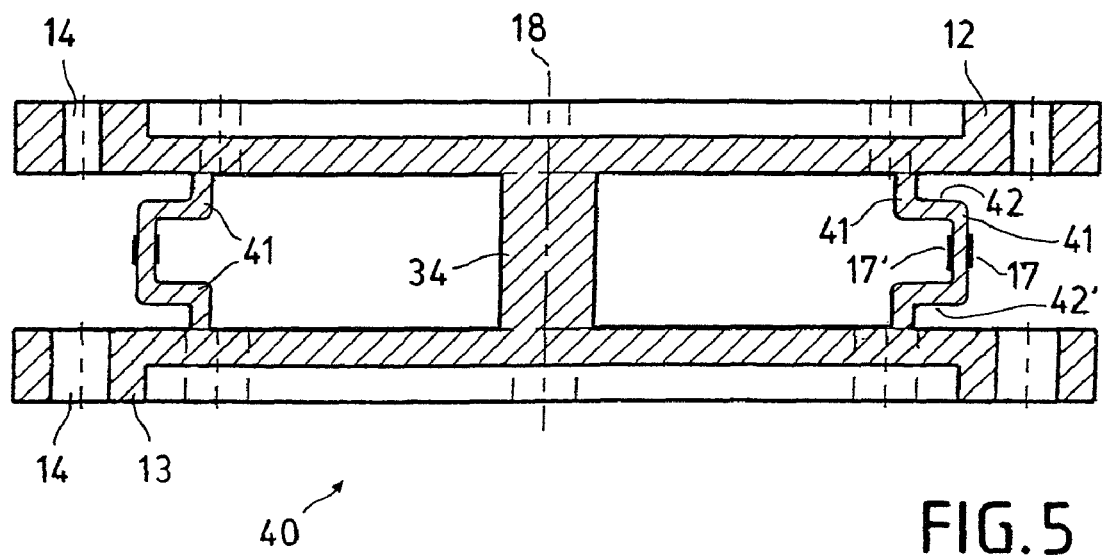
FIG. 5 is a sectional view of a third embodiment of the corner load sensor.

FIG. 5 shows a third embodiment of the corner load sensor in a sectional view. Parts identical to those of FIG. 4 are identified by the same reference numerals and will not be described again here. In this embodiment the tube 41 has the form of a corrugated membrane tube, to further reduce the rigidity of this tube against vertical forces and thereby to further increase its sensitivity to corner load torques. Furthermore, additional strain gauges 17' can be applied to the inside of the tube 41, such that in this embodiment the strain gauge 17' is compressed upon loading, whereas the strain gauge 17 on the outside of the tube 41 is elongated upon loading. This makes it possible to construct a complete Wheatstone bridge with elongated and compressed strain gauges to again obtain a larger electrical output signal of the corner sensor 40.

The strain gauges in FIG. 5 can be applied, alternatively or in addition, to the horizontal areas 42 and/or 42' of the tube 41. Compressed and elongated zones occur also in these horizontal areas, so that signals of both signs can be obtained with the strain gauges. This eliminates the comparatively difficult application of the strain gauges to the inside of the tube 41 as shown in FIG. 5.

The corrugated tube embodiment illustrated in FIG. 5 is also possible in a configuration without a support rod. This embodiment, which is very soft and sensitive, is particularly suited for small loads. The sensitivity of the corner load sensor in the embodiments that include a support rod can be further increased by forming constrictions on the support rod to create areas with a smaller cross section (not shown). These short regions with a smaller cross section influence the flexibility against vertical forces very little but influence the flexural stiffness a great deal.

The foregoing discussion has assumed that the corner load sensor is used for computationally correcting the corner load of a scale. However, it is also possible to use the signal of the corner load sensor to determine the center of gravity of the weighing goods. If the output signal of the corner load sensor is zero, the center of gravity of the weighing goods is precisely on the axis of symmetry 18 of the corner load sensor. By using known algorithms, the size of the output signal of the corner load sensor can be used to determine the lateral deviation of the center of gravity if the weight of the weighing goods is known.

The corner load sensor can also facilitate the manufacture of scales. Instead of calibrating the scale to be 100% free from corner loads, it may be more cost-effective to calibrate the scale only roughly during the manufacturing process and to achieve the freedom from corner loads using the corner load sensor and the electronic correction processor. If a modular construction principle is used in manufacture, it is then possible, for example, to produce and directly sell scales with an average resolution that are corner load calibrated. Scales with a higher resolution are then simply produced by using these same basic devices and in addition installing the corner load sensor and the electronic correction processor.

For a force-feedback-free connection of the corner load sensor with the electronic correction processor, a radio link and an optical link are described above. Wire-bound connections are also possible as long as they are practically force-feedback-free. Gold band connections are frequently used for this purpose, for example. With a proper configuration, these connections are also force-feedback-free in the sense that the forces of the gold bands are smaller than the resolution of the scale and therefore do not affect the accuracy of the scale.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. A top-pan scale comprising:
   a pan supported on at least one force transducer of a force measurement system; and
   a corner load sensor either supported on the pan or interposed between the pan and the force transducer, the corner load sensor arranged to output a signal when goods being weighed are positioned eccentrically on the pan, the corner load sensor having a flat underside configured to be positioned onto the pan of the scale, the corner load sensor having a flat upper side configured to receive the pan positioned onto the corner load sensor, and the corner load sensor being connected to a positionally fixed electronic correction processor via a force-feedback-free connection for outputting the signal to the electronic correction processor.

2. The top-pan scale as claimed in claim 1, wherein the pan is a weighing pan.

3. The top-pan scale as claimed in claim 1, wherein the pan is a bottom pan.

4. The top-pan scale as claimed in claim 1, wherein the corner load sensor has a hollow cylindrical shape capped with a respective flange at each end.

5. The top-pan scale as claimed in claim 4, wherein the end flanges of the corner load sensor are formed as end disks and wherein the corner load sensor further comprises a support rod extending between the two end disks on the axis of symmetry of the hollow cylindrical shape.

6. The top-pan scale as claimed in claim 4, wherein the diameter of the cylindrical shape is greater than the height of the cylindrical shape.

7. The top-pan scale as claimed in claim 4, wherein at least one of the flanges comprises fixation holes.

8. The top-pan scale as claimed in claim 4, wherein the cylindrical shape has at least one bulge defining a corrugation.

9. The top-pan scale as claimed in claim 4, further comprising at least four strain gauges, each mounted to the cylindrical shape in an orientation to measure strains in directions along the height of the cylindrical shape.

10. The top-pan scale as claimed in claim 1, wherein the force-feedback-free connection comprises a radio link.

11. The top-pan scale as claimed in claim 10, further comprising an electronics component providing the signal from the corner load sensor to the radio link and receiving operating power via the radio link.

12. The top-pan scale as claimed in claim 1, wherein the force-feedback-free connection comprises an optical link.

13. The top-pan scale as claimed in claim 1, further comprising an A/D converter receiving the signal from the corner load sensor.

14. The top-pan scale as claimed in claim 1, wherein the electronic correction processor comprises a personal computer programmed to digitally correct the signal from the corner load sensor.

15. A weighing system, comprising:
a surface for a subject having a weight;
a force transducer converting the weight into a weight signal;
a sensor removably interposed between the surface and the transducer,
   wherein the sensor supports the surface exclusively in a first plane and is supported on the force transducer exclusively in a second plane, such that the sensor is fixed relative to the surface in at least two mutually perpendicular directions and is fixed relative to the force transducer in three mutually perpendicular directions,
   wherein the sensor comprises at least one portion extending between the first plane and the second plane, and
   wherein the sensor further comprises a plurality of strain gauges mounted to the at least one portion and arranged to convert strains in the portion into at least one eccentricity signal;
an electronic converter converting the eccentricity signal into a wireless transmission signal; and
a processor physically disconnected from the sensor and having an input for the wireless transmission signal, and processing the wireless transmission signal into a value corresponding to the strains.

16. The weighing system as claimed in claim 15, wherein the processor further comprises an input for the weight signal and a stored algorithm for calculating a corrected weighing result from the weight signal and the value.

17. The weighing system as claimed in claim 15, wherein the portion has a hollow cylindrical shape extending between two end disks respectively defining the first plane and the second plane.

18. The weighing system as claimed in claim 15, wherein a fixed connection fixes the sensor to the force transducer in the three mutually perpendicular directions.

19. The weighing system as claimed in claim 15, wherein a positive locking fixation fixes the surface to the sensor in the at least two mutually perpendicular directions.

20. A weighing system, comprising:
a surface for a subject having a weight;
a force transducer converting the weight into a weight signal;
a sensor removably interposed between the surface and the transducer,
   wherein the sensor supports the surface in a first single and immovable plane and rests on the force transducer in a second single and immovable plane,
   wherein the sensor comprises at least one portion having a hollow cylindrical shape that extends between two end disks respectively defining the first plane and the second plane, and
   wherein the sensor further comprises a plurality of strain gauges mounted to the at least one portion and arranged to convert strains in the portion into at least one eccentricity signal;
an electronic converter converting the eccentricity signal into a wireless transmission signal; and
a processor physically disconnected from the sensor and having an input for the wireless transmission signal, and processing the wireless transmission signal into a value corresponding to the strains.

* * * * *